Feb. 18, 1969  L. L. KRUEGER  3,428,073
SAFE LEAK VALVE
Filed July 21, 1966

INVENTOR.
LOREN L. KRUEGER
BY
ATTORNEY.

3,428,073
SAFE LEAK VALVE
Loren L. Krueger, Minnetonka, Minn., assignor to Honeywell Inc., Minneapolis, Minn., a corporation of Delaware
Filed July 21, 1966, Ser. No. 566,907
U.S. Cl. 137—312
Int. Cl. F16k 27/00, 51/00

2 Claims

ABSTRACT OF THE DISCLOSURE

A safe leak valve having a continuously reciprocating valving member which connects an inlet conduit to an accumulator, and then disconnects the accumulator from the inlet conduit while connecting the accumulator to an outlet conduit, and continuously repeats this operation only so long as the valving member continues to reciprocate, with all possible leakage paths being away from the inlet-outlet flow path.

---

My invention is concerned with a dynamic safe leak valve wherein failure of the valve in a static position interrupts flow through the valve, the valve being constructed and arranged such that all leakage paths are away from the normal flow path and to a safe leak area.

When my fail safe valve is applied, for example, to a fuel transport system supplying fuel to a burner, failure of the valve is such that fuel does not flow to the combustion system in an uncontrolled manner. Also, all leakage, due to wear of the parts and the like, is to a safe leak area and away from the normal flow path leading from a fuel supply area to the burner.

The structure of my invention provides an inlet area, an accumulator area, and an outlet area. A valving member sequentially allows flow from the inlet area to the accumulator area, while blocking flow from the accumulator area to the outlet area. Thereafter, the fuel accumulated in the accumulator area is allowed to flow to the outlet area, while the flow from the inlet area to the accumulator area is blocked. All leakage paths from one area to the other includes, as a portion of the leakage path, a safe leak area. As an example, this safe leak area may be an area of low pressure, as created by a venting blower or the like, the pressure in this area being lower than the pressure of the inlet area, the accumulator area or the outlet area.

I am aware of valves which require dynamic operation, for example the valve disclosed in W. G. Rowell U.S. Patent 3,227,311. However, such prior art structures are constructed such that failure or wear of the valve allows direct uncontrolled communication through the valve. The structure of my invention overcomes this uncontrolled flow by a structural relationship which requires that all leakage be to safe leak area.

Figure 1:
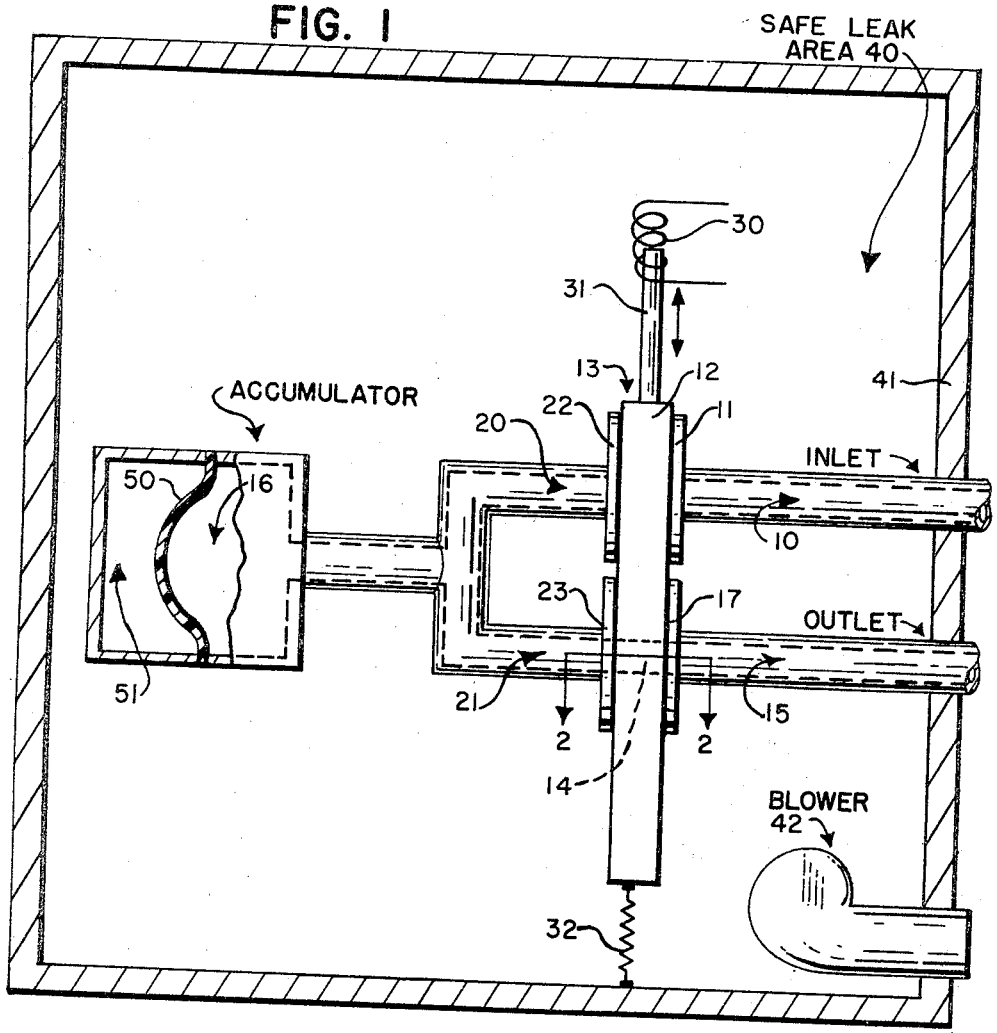
Figure 2:
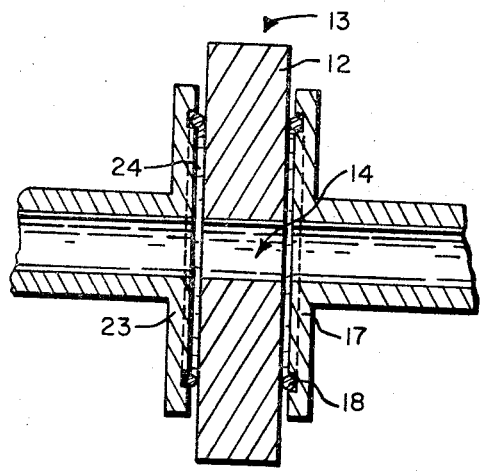

Referring to the drawings, FIGURE 1 is a diagrammatic representation of the dynamic safe leak valve of my invention, the valve being incorporated in a housing which includes a blower to establish a safe leak area, and FIGURE 2 is a cross section view of a portion of the valve of FIGURE 1, showing a sealing means and the manner in which the safe leak is accomplished.

Referring to FIGURE 1, the normal flow path is from inlet area 10 to accumulator area 16, and then from accumulator area 16 to outlet area 15. The flow through this flow path occurs in step fashion, and only with dynamic up-and-down movement of valving member 13. As will be apparent, all leakage paths are to a safe leak area 40.

Reference numeral 10 designates an inlet conduit adapted to be connected to a source of fluid under pressure, for example, fuel oil to be supplied to an oil burner. Inlet conduit 10 terminates at an annular collar 11 having a flat surface abutting a flat surface 12 of a valving member 13.

Referring to FIGURE 2, it can be seen that valving member 13 is generally rectangular in cross section and includes an opening 14 which, in FIGURES 1 and 2, is in position to allow communication from an outlet conduit 15 to an accumulator 16. As with conduit 10, conduit 15 terminataes at an annular collar 17. Embedded within an annular recess in collar 17 is an annular O-ring 18 which cooperates with surface 12 of valving member 13 and provides a sealing means.

Accumulator 16 includes conduit portions 20 and 21 which terminate in annular collars 22 and 23. Collar 23 is shown in FIGURE 2 and an O-ring 24 is provided for sealing. Collars 11 and 22 are also constructed as shown in FIGURE 2, also having O-ring seals.

The dimensions of collars 11, 17, 22 and 23, and the position of the O-ring seals in the collar, are related to the diameter of opening 14 to insure that inlet area 10, accumulator area 16, or outlet area 15 do not communicate with safe leak area 40 as valving member 13 moves.

Accumulator 16 includes a flexible diaphragm 50 which forms a sealed rear portion 51 containing a compressible gas. When accumulator 16 is connected to inlet conduit 10, the fluid being valved compresses the gas. When accumulator 16 is connected to outlet conduit 15, the compressed gas forces the fluid to the outlet conduit.

Valving member 13 moves in a dynamic fashion. Upward movement of valving member 13 results from energization of a solenoid winding 30 which cooperates with an armature 31 to cause the valving member 13 to move upward against the force of a spring 32. Upward movement continues until opening 14 in the valving member is aligned with the openings in conduits 10 and 20. Deenergization of solenoid 30 causes valving member 13 to return to the position shown in FIGURE 1.

The drawing is diagrammatic and various guides, stops, and the like have not been shown. The logic system whereby solenoid 30 is energized in on-off step fashion is not shown. The essential concept of my invention is that valving member 13 operate in a dynamic manner and that all leakage paths are away from the flow path, as distinguished from through the flow path.

The normal flow path is from inlet area 10, through opening 14, to accumulator area 16, where a quantity of fluid is accumulated. When valving member 13 returns to the position shown in FIGURE 1, the accumulated fluid in accumulator 16 is allowed to flow through opening 14 to outlet area 15. Thus, should the valving member 13 fail in a static position, continuous flow from inlet area 10 to outlet area 15 is interrupted. Furthermore, should leaks occur, these leaks are away from the flow path. For example, if a leak should develop around O-ring seal 18 (FIGURE 2), this leak is to a surrounding safe leak area 40. This safe leak area may be created by placing the structure of my invention in a housing 41 and venting the housing by means of a blower 42 to create a low pressure area within safe leak area 40, this pressure being lower than the pressure in inlet area 10, accumulator area 16, or outlet area 15. Since the collars 11, 17, 22 and 23 are constructed in the same manner, and include sealing means such that any leakage flow path includes the safe leak area, uncontrolled flow of fluid from the inlet area to the outlet area is prevented.

I claim as my invention:
1. A safe leak valve comprising;
    means defining a flow path including an inlet area, an accumulator area, and an outlet area,
    valving means structurally arranged such that dynamic operation of said valving means sequentially permits flow from said inlet area to said accumulator area while blocking flow from said accumulator area to said outlet area, followed by flow from said accumulator area to said outlet area while blocking flow from said inlet area to said accumulator area, and a plurality of individual sealing means each of which cooperates with only one of said inlet area, said accumulator area, and said outlet area and also with said valving means to normally confine the flow to said flow path, such that the leakage of said sealing means is away from said flow path.

2. A valve as defined in claim 1 wherein said valving means includes operating means adapted to cause dynamic movement of said valving means so long as flow through said flow path is desired.

References Cited

UNITED STATES PATENTS

| | | |
|---|---|---|
| 920,825 | 5/1909 | Clark. |
| 1,708,273 | 4/1929 | Larsen _____ 137—312 |
| 2,293,906 | 8/1942 | Kvavle et al. __ 137—625.25 XR |
| 2,633,708 | 4/1953 | Sedgwick _____ 137—625.26 XR |
| 2,816,730 | 12/1957 | Rabas _____ 251—328 |
| 2,858,851 | 11/1958 | Holl _____ 137—625.68 XR |
| 2,879,797 | 3/1959 | Guaraldi _____ 251—174 XR |
| 3,132,669 | 5/1964 | Feldsted _____ 137—625.48 |

FOREIGN PATENTS 474,539  11/1937  Great Britain.

HENRY T. KLINKSIEK, *Primary Examiner.*

U.S. Cl. X.R.

137—625.25